Figure 1:
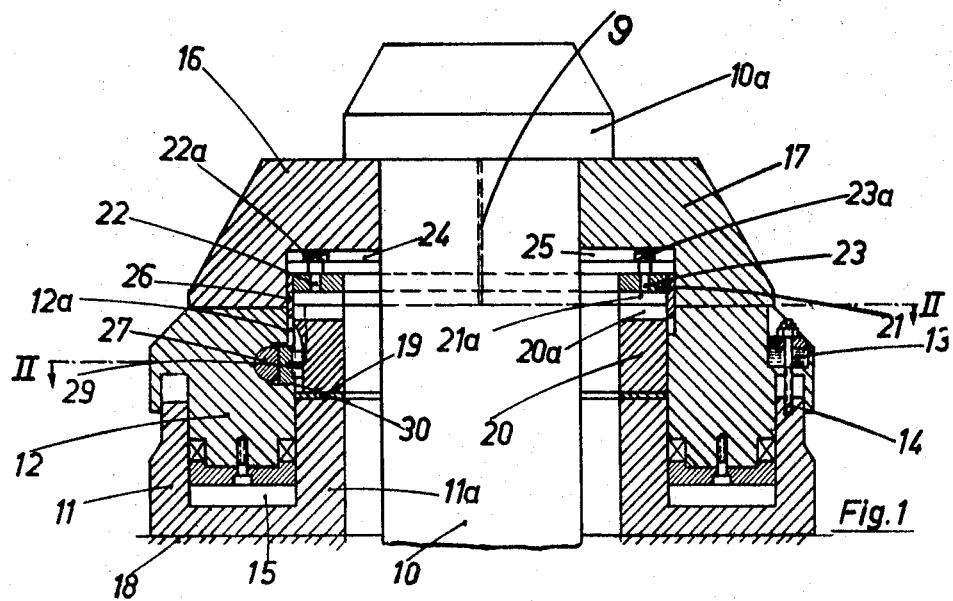

United States Patent

[11] 3,588,044

| [72] | Inventors | Ernst Georg Reichrath;<br>Otto Kark Buchheit, St. Ingbert (Saar), Germany |
|---|---|---|
| [21] | Appl. No. | 668,284 |
| [22] | Filed | Sept. 5, 1967 |
| [45] | Patented | June 28, 1971 |
| [73] | Assignee | Verwaltungsgesellschaft Moeller und Neumann offene Handelsgesellschaft |
| [32] | Priority | Sept. 14, 1966 |
| [33] | | Germany |
| [31] | | V.31932 |

[54] TIE ROD CLAMP DEVICE
5 Claims, 5 Drawing Figs.

[52] U.S. Cl. .................................................. 254/29, 72/237
[51] Int. Cl. .................................................... E21b 19/00
[50] Field of Search ............................................ 72/237, 248; 81/57.38; 254/29 (.5)

[56] References Cited
UNITED STATES PATENTS

| 2,760,393 | 8/1956 | Stough | 81/57.38 |
| 2,763,464 | 9/1956 | Leonhardt | 254/29(5) |
| 3,158,052 | 11/1964 | Biach | 81/57.38 |
| 3,230,799 | 1/1966 | Maciulaitis | 81/57.38 |

FOREIGN PATENTS

| 1,143,773 | 2/1963 | Germany | 72/237 |
| 1,269,623 | 5/1960 | France | 72/237 |

*Primary Examiner*—Othell M. Simpson
*Attorney*—John J. Dennemeyer

ABSTRACT: A tie rod clamping device suitable for example for rolling mill stands incorporates a hydraulic stressing device operatively connected between one end of the tie rod and one of two or more members to be held in compression by the tie rod to permit the tie rod to be expanded by hydraulic action, and in which the compressive force of the tie rod is adapted to be transmitted through a rapid adjustment thrust-transmitting device, such as a dog clutch, rotatable from a tooth-to-tooth position to a tooth-to-gap position, either to transmit force to the connected members or alternatively to allow for contraction of the tie rod without transmitting compressive forces to the connected members.

TIE ROD CLAMP DEVICE

The invention relates to a hydraulic tie rod clamping device for clamping cooperating components including a device for hydraulically expanding the tie rod independently of a clamp nut for the purpose of adjusting the prestressing in components subjected to a clamping force by the tie rod when the hydraulic pressure is released or reduced.

Such devices are known as "hydraulic nuts" and may consist of ring-shaped members, namely a cylinder and a piston, in which one member is directly connected with the tie rod by means of a clamp nut and is displaced with the expansion of the tie rod under hydraulic stressing, and the other member rests against a support. The clamp nut represents then a vertically adjustable positioning device or support member between the ends of the tie rods which absorbs the prestressing forces and functions through rigid parts if the pressure is released or reduced after expanding the tie rod and after screwing down the clamp nut to absorb the play.

The preferred field of application of the so-called hydraulic nut is in rolling mill constructions especially the construction of prestressed roll stands, including frameless stands. One disadvantage of hydraulic nuts which is now recognized consists in the fact that the prestressed components cannot be quickly released from pressure in order to free the screw-threaded screwdown devices disposed between the components or to release a strip or rod jammed in the rolls. This follows firstly from the fact that the hydraulic clamping pressure is developed in all the components lying between the ends of the tie rods and secondly from the fact that for releasing the pressure on the components the clamp nut must be unscrewed which occupies a considerable amount of time. This is the case with the construction described in U.S. Pat. No. 2,571,265.

In order to avoid this disadvantage, hydraulically expansible tie rod constructions have been developed in which the hydraulic clamping pressure avoids or bypasses all or at least one of the stressed constructional components. These are hollow tie rods with hydraulic pressure acting on the bottom of the tie rod, or massive tie rods with a ring piston of the hydraulic stressing device which rests against one end of the tie rod traversing at least one of the constructional components. For example for releasing jammed rolls it is only necessary in this case to increase the hydraulic pressure since with the expansion of the tie rod all the components or at least one component can follow the displacement of one end of the tie rod and thus be released from pressure as described in U.S. Pat. Nos. 2,934,968 and 3,130,628.

The invention is directed to the problem of improving hydraulic clamping devices in the direction of providing a more rapid release of the stressed constructional components and to provide devices which can be remote controlled since it has the advantage of providing greater simplicity as compared with the other known solutions for massive tie rods. The adjusting function of the clamp nut is taken over according to the invention by another nonthreaded adjusting device or a thrust member and it is immaterial whether the clamp nut remains as the force-absorbing tie rod head or is replaced by another functionally similar protuberance providing a connection between the tie rod and the hydraulic clamping device.

Starting from the aforesaid features the invention provides a so-called hydraulic nut such that the nonthreaded support member can be adjusted rapidly between an operative position in which, on contraction of the tie rod, it transmits the prestressing force from a head or collar of the tie rod to the support, and an inoperative position. To provide for a rapid adjustment it is proposed to include a vertically movable thrust-transmitting structure which lies outside of the hydraulic clamping force, which consists of two support rings arranged one over the other with mutually facing tooth faces arranged in the manner of a dog clutch and of which one support ring is nonrotatable and the other rotatably operable between a tooth-to-tooth position and a tooth-to-gap position of the rings when the tie rod is expanded. In the tooth-to-tooth position the tensional force produced by the hydraulic stressing in the tie rod on reduction of the hydraulic pressure is transmitted through the support rings while avoiding or bypassing the hydraulic clamping device, into the components disposed between the ends of the tie rod as the force for providing prestressing of the stand, whereas with the tooth-to-gap position the support rings are inoperative so that the tie rod can be shortened with mutual entry of the dog teeth until the stress-free condition is reached. In this operating position a prestressed condition can be selected for a given hydraulic pressure whereby a roll stand is indeed somewhat softer as compared with prestressing only through rigid parts but the system can however be rapidly released from pressure without operating the rotatable support ring.

The device according to the invention for expanding a tie rod independently of the clamp nut can also be incorporated for hydraulic roll gap adjustment with the effect that one can rapidly change over between operation as an automatic regulating frame and —for example when the regulation is not in operation—as a pure prestressed system with a stiff roll stand.

To permit a particularly rapid changeover of the rotatable support ring it is desirable to provide a hydraulic device for effecting the rotation, comprising a piston movable between two stop positions and carrying a tooth which engages in a groove of the periphery of the support ring and in which the piston stroke corresponds to the rotation of the support ring by one-half pitch of the dog clutch arrangement.

Figure 2:
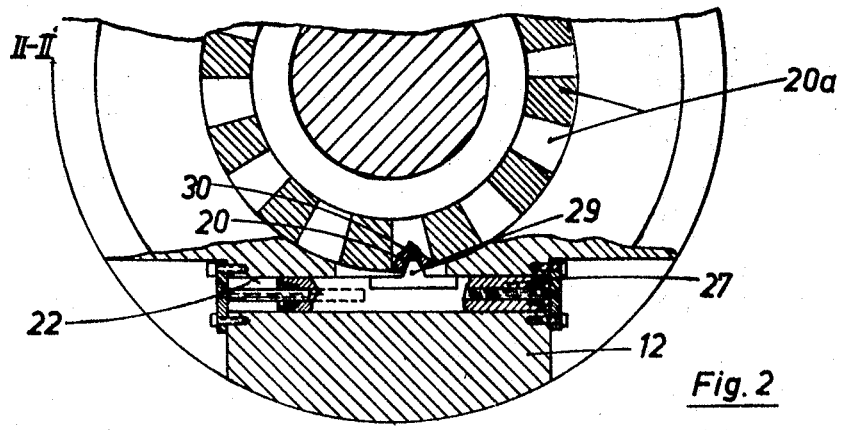
Figure 3:
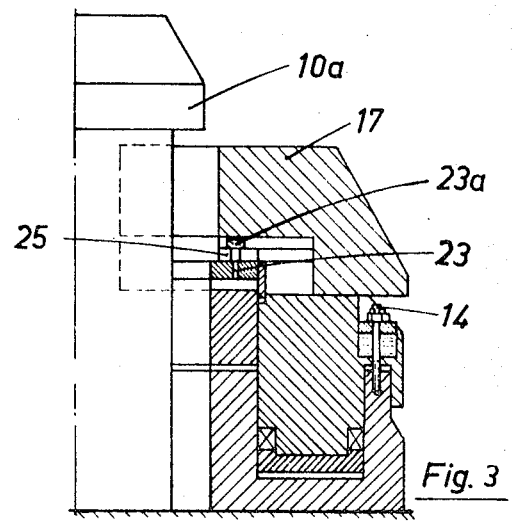
Figure 4:
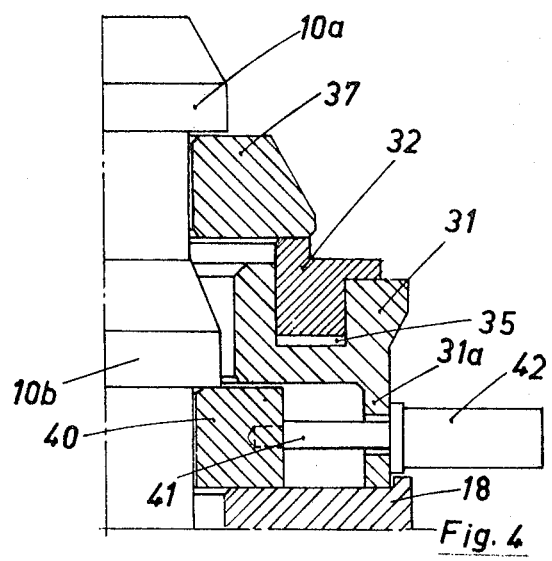
Figure 5:
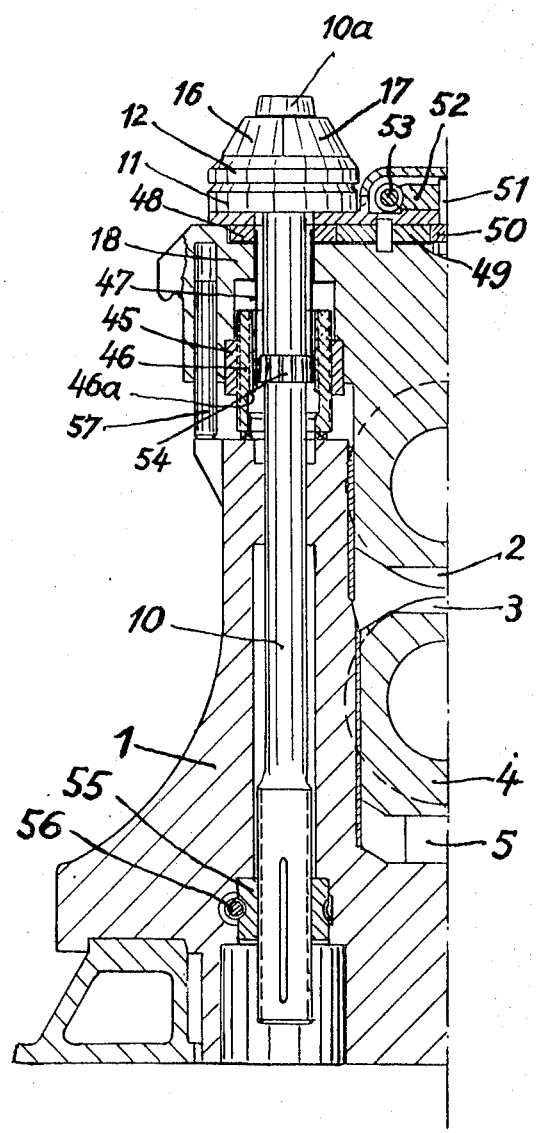

Further features will be seen from the drawing and the following description in which two constructional examples of a device according to the invention are shown in the form of a device disposed beneath the top end of the tie rod, and in which:

FIG. 1 shows a constructional embodiment in vertical section through the device, FIG. 2 shows a horizontal section on the line II–II in FIG. 1, FIG. 3 shows a vertical half-section like FIG. 1 with another clamping condition of the device, FIG. 4 shows another embodiment in section similarly to FIG. 3, and FIG. 5 is a vertical section through a roll frame with a hydraulic tie rod device according to the present invention.

The hydraulic clamping device proper consists of a ring cylinder 11 and a ring piston 12 surrounding the tie rod 10, the piston being constantly pressed downwardly by means of peripherally distributed screwbolts 14 subjected to the action of compression springs 13 so as to overcome the sleeve friction when the hydraulic pressure is released in the ring-shaped working chamber. In the constructional example shown the ring piston 12 is connected directly through a divided ring 16, 17 with the end of the tie rod by engaging beneath a protuberance thereon, such as an enlarged head 10a. Further in the embodiment shown the divided ring 16, 17 consists in plan of two semicircular segments the dividing joint being illustrated in dotted lines at 9 in FIG. 1. The ring cylinder 11 rests on a support 18 which may be the stand cap or the upper chock of a roll stand.

A thrust member in the form of a support ring 20 is rotatably supported within the inner wall 11a of the ring cylinder 11 as shown in FIGS. 1 to 3 and rests on a bearing ring 19. Opposite to it is a nonrotatable thrust member or support ring 21 which is suspended by means of two diametrally opposite screws 22, 23 from the half rings 16, 17 extending between the ring piston 12 and the enlarged tie rod head 10a. The screwheads 22a and 23a are of hammerhead shape and are guided in radial inwardly open T-grooves 24, 25 in the half rings 16, 17. These T-grooves are necessary in order that the half rings 16, 17 can move apart and be withdrawn while the upper support ring 21 remains in position. This is necessary since the two support rings 20 and 21 are provided with mutually facing teeth 20a and 21a in the manner of a dog clutch, which can engage one in the other as required for example in the condition of the device shown in FIG. 3. It should be observed that the upper support ring 21, even if it were divided like the removable divided ring 16, 17 could not move laterally together with the ring halves 16, 17 due to the properties of the dog clutch teeth. For this reason the nonrotatable upper support ring 21 is not divided and is centered by an outer ring 26 in an internal recess 12a or the ring piston 12, thus centering it relatively to the rotatable support ring 20.

From FIG. 2 in conjunction with FIG. 1 it will be seen that the rotary drive for the lower support ring 20 consists of a hydraulic actuator piston device, the piston 27 of which is guided in a cylinder bore 28 in the ring piston 12 running tangentially to the support ring 20. The piston 27 has a single tooth 29 which engages a groove 30 in the periphery of the support ring 20. The operating movement of the actuator drive piston 27, which is defined by two stop surfaces, corresponds to the half-pitch t/2 of the dog clutch teeth 20a so that the opposed teeth 20a and 21a of the support rings 20, 21 can be brought selectively either to a tooth-to-tooth position or to a tooth-to-gap position.

In FIG. 1 a condition is shown in which the ring piston 12 of the clamp device is operated at high pressure and the tie rod is expanded. Since thereby the divided ring 16, 17 carries the upper support ring held to it, the dog clutch teeth 20a and 21a are out of engagement.

FIG. 5 shows typical application of the tie rod device described above to one construction of a roll stand in which the lower end of the tie rod 10 is engaged in the base of a lower stand member 1 and the other end thereof includes in outline elevation the members shown in FIGS. 1 to 3 of the drawings, disposed between the enlarged head 10a and the support which is shown as the stand cap 18. The stand cap 18 serves in this embodiment as the chock for a top roll 2 and a lower roll 3 is supported in chocks 4 resting against spacer blocks 5 on the lower stand member 1.

A mechanical screwdown device is provided for adjustment of the gap between the rolls 2 and 3. Each tie rod 10 is associated with a screw-threaded spacer ring or nut 45 which is nonrotatably mounted in the top chock or cap 18 and which cooperates with an externally screw-threaded spacer ring 46 resting on the lower stand part 1. The screw-threaded ring 46 is provided with internal splines 46a which engage external teeth on a sleeve 47 which carries a gear wheel 48 at its upper end which is adapted to be rotated through an idler gear 49 from a driving pinion 50. The pinion 50 is mounted on a spindle 51 which also carries a worm wheel 52 adapted to be rotated to be rotated by a worm 53 which is rotatable for effecting screwdown movements. When the screwdown is operated the spacer ring 46 is rotated within the stationary threaded ring 45 in order to lift or lower the cap or upper chock 18 and the top roll 2 with it.

To perform this screwdown movement it is however necessary that the head 10a of the tie rod should be displaced in the same way, and for this purpose the sleeve 47 is provided with internal splines which engage a toothed member 54 formed on the tie rod 10 so that the latter is caused to rotate during the screwdown movements.

The engagement between the lower end of the tie rod and the base of the stand part 1 is provided by means of a nut 55 rotatably operable by means of a worm 56 when required. During this screwdown movement the nut 55 is unable to rotate due to the self-locking action of the worm 56 and the nut 55 has the same pitch as the screw thread between the spacer rings 44 and 46 so that the tie rod 10 is adjusted to the same extent as the spacing between the top chock or cap 18 and the lower stand part 1 varies. The drive for the nut 55 by means of the worm 56 is available if the tie rod is to be adjusted axially independently of the screwdown device. Hydraulic piston devices 57 arranged in the stand cap or chock 18 serve for balancing the weight of the top chock or stand cap assembly. The device shown in FIGS. 1 to 3 and in elevation in FIg. 5 permits operation in various modes which will now be explained.

OPERATING MODE I

With a tooth-to-gap position of the support ring teeth 20a and 21a operation is with pressure applied to the working chamber 15. To release the screwdown-threaded members in the path of the pressure forces transmitted downwardly from the ring cylinder it is only necessary to reduce the hydraulic clamping force whereby also jammed rolls can be quickly released. The support ring teeth 20a, 21a engage one within the other when the pressure is reduced. If the pressure is completely released the peripherally distributed spring-loaded screws 14 force the ring piston 12 so far inwardly that, as shown in FIG. 3, not only is the tie rod 10 completely released, but also the half rings 16, 17 can be drawn laterally outwardly. In the position shown in FIG. 3 the support 18, for example a stand cap, together with the four clamp devices can be lifted over the tie rod heads 10a.

The peripherally distributed screws 14 further ensure that the ring piston 12 cannot rotate due to reaction forces when operating the actuator piston drive.

OPERATING MODE II

For a tooth-to-tooth position the end faces of the support ring teeth seat one upon the other when the pressure in the working chamber 15 is reduced. The roll stand is prestressed exclusively through rigid components. For screwdown the increase in pressure of the upper support ring must be so far increased that the lower support ring 20 is allowed to rotate to the tooth-to-gap position after which the clamping pressure can be again reduced. For screwdown movements the support 18 and thus also the lower support ring 20 must vary in height and it is for this reason that the tie rod 10 is designed for axial adjustment, as shown in FIG. 5, by its engagement with the nut 55.

OPERATING MODE III

If the device according to the invention, that is the ring cylinder 11, the ring piston 12 as well as the support ring 20 with its actuating device 27, 28 is arranged between two constructional components, for example between a stand cap and the lower stand part, or between two chocks of a roll stand, and the nonrotatable support ring 21 is held in a constructional member located above it, that is to say, in the stand cap, the roll stand can be operated selectively as a prestressed stand with a fixedly adjusted roll gap or—with tooth-to-gap setting of the support ring 20, 21—as a regulating stand wherein the hydraulic pressure in the working chamber 15 is varied according to the signals from a regulating device in known manner.

Another constructional example of the invention is shown in FIG. 4 in which the ring cylinder 31 of the hydraulic stressing device rests by means of a ring-shaped member 31 on the support 18 which may be the stand cap of a rolling stand. If the pressure is increases in the pressure chamber 35 the ring piston 32 engages a transversely divided ring 37 similar to the ring halves 16, 17 of FIGS. 1 to 3, which bears against the outer head 10a of the tie rod and subjects it to stress.

Within the ring-shaped chamber surrounded by the member 31a is disposed a nonthreaded and rapidly adjustable support member in the form of two diametrally displaceable half rings 40 on the support 18 which in the operative position shown fit beneath a collar 10b of the tie rod in the form of a closed ring and transmit the tensional forces of the tie rod made available by the hydraulic clamping device to the support and thus to the stressed components of the system.

The piston rod 41 of an operating cylinder 42 engages each diametrally displaceable half ring 40, the cylinder being fastened to a ring-shaped extension 31a of the ring-shaped member 31.

For adjustment for operating mode I the pressure in the pressure chamber 35 is increased until, with the expansion of the tie rod, the collar 10b is released from the half rings 40 after which the operating cylinders 42 cause the half rings 40 to move in the diametral direction to an inoperative position. The system is released from pressure when the hydraulic pressure is reduced. For adjustment to operating mode II the half rings 40 are moved forwardly after stressing the tie rod to the position shown in FIG. 4. Operating mode III is also possible and need not be further explained.

The constructional example according to FIG. 4 has the advantage that after removal of the upper loose half rings 37 the ring cylinder 31 can be taken down with the tie rod stressed in order to replace a seal. Obviously to facilitate this operation an operating cylinder functionally like the cylinder 42 can be provided as a rapid operating means also for the upper half rings 37, and such means may also be provided in the embodiment of FIGS. 1 to 3.

We claim:

1. A tie rod stressing device for clamping together a plurality of cooperating components such as the roll-supporting members of a rolling mill stand comprising, in combination, a tie rod arranged to interconnect said cooperating components together for clamping engagement, said tie rod having shoulder means extending outwardly therefrom, fluid-pressure-operated means operatively associated with said tie rod and one of said components for axially expanding said tie rod to clamp said components together with a selected clamping force, thrust transmitting means operatively associated with said tie rod and said one component, means for moving said thrust transmitting means in underlying relationship with said shoulder means into an operative position for limiting the contraction of said tie rod to a predetermined extent upon the release of the tie rod from an axially expanded condition by said fluid-pressure-operated means to maintain a selected clamping force on said components and into an inoperative position out of engagement with said shoulder means to permit contraction of said tie rod into a relaxed condition upon the release of said clamping force by said fluid-pressure-operated means.

2. A tie rod stressing device in accordance with claim 1 wherein said thrust transmitting means include a support ring operatively associated with said tie rod and a support ring operatively associated with said one component, said support rings being positioned in surrounding, axially spaced relationship with said tie rod, a plurality of teeth on the adjacent faces of said support rings and wherein said moving means is connected to one of said support rings for rotating said one support ring into said operative position with said teeth on said rings in overlying relationship and into said inoperative position with the teeth on one of said rings extending within the gaps between the teeth on the other of said rings.

3. A tie rod stressing device in accordance with claim 2 wherein said moving means comprises a fluid-pressure-operated device having a cylinder and a piston movable therein, a tooth on said piston engageable with said one support ring, said cylinder having a pair of stop surfaces, said piston being movable into a pair of stop positions against said stop surfaces for positioning said one support ring in said operative and unoperative positions respectively.

4. A tie rod stressing device in accordance with claim 3 wherein said fluid-pressure-operated means includes a ring cylinder surrounding said tie rod and operatively associated with said one component and a ring piston movably positioned in said cylinder and in surrounding, operative association with said tie rod.

5. A tie rod stressing device in accordance with claim 1 wherein said thrust transmitting means comprise a circumferentially extending collar on said tie rod, a pair of complementary half rings positioned in surrounding relationship with said tie rod, and wherein said moving means include a fluid-pressure-operated cylinder having a piston connected to each of said half rings for moving said half rings together into an annular relationship for engagement with said collar and said one component in said operative position and for moving said half rings out of said annular relationship into said inoperative position.